(12) United States Patent
     Dietz (10) Patent No.: US 8,374,424 B2
(45) Date of Patent: Feb. 12, 2013

(54) METHOD AND APPARATUS FOR MAKING MULTIPLE COPIES OF A MOSAIC

(76) Inventor: John E. Dietz, Circle Pines, MN (US)

( * ) Notice: Subject to any disclaimer, the term of this patent is extended or adjusted under 35 U.S.C. 154(b) by 292 days.

(21) Appl. No.: 12/965,145

(22) Filed: Dec. 10, 2010

(65) Prior Publication Data

US 2012/0082375 A1   Apr. 5, 2012

Related U.S. Application Data

(60) Provisional application No. 61/404,428, filed on Oct. 2, 2010.

(51) Int. Cl.
     *G06K 9/00*      (2006.01)
     *G09G 5/00*      (2006.01)
(52) U.S. Cl. .......................... 382/162; 345/619
(58) Field of Classification Search .................. None
     See application file for complete search history.

(56) References Cited

U.S. PATENT DOCUMENTS

| | | | |
|---|---|---|---|
| 220,893 A | 10/1879 | Westcott | |
| 3,130,106 A | 4/1964 | Bornand | |
| 3,969,558 A | 7/1976 | Sadashige | |
| 4,624,815 A | 11/1986 | Moufarrege | |
| 5,913,992 A * | 6/1999 | Gerber | ............................ 156/64 |
| 5,955,208 A | 9/1999 | Takahashi | |
| 6,003,577 A | 12/1999 | Morito | |
| 6,103,329 A | 8/2000 | Hiserote | |
| 6,985,621 B2 | 1/2006 | Bremsteller | |
| 7,242,799 B1 | 7/2007 | Bremsteller | |
| 2002/0154143 A1 | 10/2002 | Maier | |
| 2007/0250197 A1 | 10/2007 | Glass et al. | |
| 2007/0261351 A1 | 11/2007 | Fiorino et al. | |
| 2007/0267137 A1 * | 11/2007 | Boosy | ........................ 156/285 |
| 2010/0178448 A1 | 7/2010 | Nakajima | |
| 2010/0194780 A1 | 8/2010 | Acworth | |

FOREIGN PATENT DOCUMENTS

WO    WO 2005/075216    8/2005

* cited by examiner

*Primary Examiner* — Li Liu
(74) *Attorney, Agent, or Firm* — Thomas J. Nikolai; Nikolai & Mersereau, P.A.

(57) ABSTRACT

The creation of multiple copies of unique and individualized mosaics is performed by creating a pattern from an image using a computer and inserting colored sticks into a frame to match the rows or columns of the pattern. After gluing the sticks of a row or column together while the sticks are still in the frame, the rows or columns are removed and joined together to form assemblies which are sliced to provide near identical copies of each assembly. The slices are then adhered to separate substrates, again in conformance with the pattern, to make multiple copies of the mosaic.

14 Claims, 10 Drawing Sheets

METHOD AND APPARATUS FOR MAKING MULTIPLE COPIES OF A MOSAIC

CROSS-REFERENCED TO RELATED APPLICATIONS

This patent application claims priority to U.S. Provisional Application Ser. No. 61/404,428 filed in the U.S. Patent and Trademark Office on Oct. 2, 2010 by John E. Dietz, the entire contents of this application being incorporated herein by reference.

STATEMENT REGARDING FEDERALLY SPONSORED RESEARCH OR DEVELOPMENT

Not applicable.

BACKGROUND OF THE INVENTION

I. Field of the Invention

The present invention relates to a type of artwork known as a mosaic. More particularly, the present invention relates to tools and methods for creating multiple copies of the same mosaic in an efficient manner.

II. Related Art

A mosaic is any surface decoration typically made by inlaying small pieces of various colored material to form pictures or patterns. This art form has existed for centuries. The earliest known examples date back to the third millennium B.C. Archeologists have discovered mosaics in ancient Mesopotamia, Macedonia, and Greece. Archeologists have also uncovered mosaics dating back to and throughout the Roman Empire. The art form was used by early Christians and by medieval artists in Italy. Mosaic art flourished in the Byzantine Empire from the sixth to the fifteenth centuries. Renaissance artists who were known for creating frescoes also created mosaics. Mosaics were often used in churches because mosaics were brighter, reflected more light and had a greater longevity than frescoes. Mosaics have their place in modern art as well. Three methods of manufacture are typically used—the direct method, the indirect method and the double indirect method. The direct method of mosaic construction involves directly gluing individual tiles onto a supporting surface. The indirect method involves applying the tiles face down on a backing paper using an adhesive to form multi-tile panels and later applying the tile panels to a substrate. The double indirect method involves placing the tiles face up on a medium, placing another medium on top of the tiles, turning the piece over, removing the original underlying material and installing the piece on a substrate as in the indirect method.

Computers and robotics have been used to automate the production of mosaics. Mosaics designed using computer-aided design (CAD) software can be assembled by robots controlled by the computer. Computer-controlled robotic manufacturing has the disadvantage of being expensive. Due to the expense, these techniques are not available to the typical artisan. Likewise, computer controlled manufacturing is only cost effective when a large number of copies (e.g., more than 1000) of a mosaic are desired. Mosaics created using robots also tend to have a different look than hand-made mosaics.

SUMMARY OF THE INVENTION

The present invention allows both professional and amateur artists to create hand-made mosaics and provide multiple copies in an efficient manner. The invention is well suited to be used to create mosaics for others or to provide a do-it-yourself kit which allows others to create multiple copies of unique and individualized mosaics in a directed manner.

The mosaics are made of wood having differing color characteristics. The wood is cut into elongated sticks having a square cross-section. The sticks are then grouped according to their color characteristics to create a pallet of available wood colors.

To assemble multiple copies of a unique, individualized mosaic in a directed fashion, a patter is created. To create the pattern, an initial image is selected and digitized. The initial digitized image can be created on a computer or can be captured using a digital camera or scanner and then transmitted to the computer. The digitized initial image is then pixilated on the computer to a predetermined number of discrete colors actually found in the image. A pre-pattern for the mosaic is then created on the computer by assigning a color from the pallet of available wood colors to the discrete colors found in the initial image. A final pattern is then created by assigning an exaggerated color to each of the colors assigned when creating a pre-pattern and providing a hard copy of the digitized image using the exaggerated colors. The hard copy is partitioned into columns and rows of cells, each cell being a predetermined number of pixels long and a predetermined number of pixels wide. Copies may also be provided of the initial image, the digitized initial image using the discrete colors found when digitizing the initial image, and of the image using the colors from the pallet of available wood colors assigned during the step of creating the pre-pattern. To assist in assembly of the mosaic, the sticks of a particular group can be tagged with the exaggerated color corresponding to the group and placed in a separate bin. A tag may be applied to the individual sticks of a group or to the bin in which a group is placed.

A frame is also provided. The frame has a plurality of elongated slots. Each slot has a transverse dimension substantially equal to the number of pixels wide (or long) of a cell of the pattern times the cross-sectional dimension of the individual sticks.

During assembly of the mosaic, sticks are selected from the bins and inserted into the slots of the frame by color in accordance with the pattern. The sticks inserted into a slot of the frame replicate the pixels in a column or row of the pattern. The sticks in a given slot of the frame are then bonded together to form a row or column corresponding to the row or column of the pattern. The adhesively bonded row or column is then removed from the frame. To simplify this step, the frame should be lined with a release material, such as wax paper, before inserting the sticks into the frame and gluing them together. The frame can also have a flexible bottom which can be flexed to separate the pieces defining the slots to assist in removal of the bonded rows or columns of sticks from the frame.

After removing the bonded-together rows or columns of sticks from the frame, assembly continues by gluing together adjacent rows or columns following the pattern to form an assembly of rows or columns. The assembly is then sliced transversely to form multiple, substantially identical layers. The layers are then affixed individually to stable substrates in a manner conforming to the pattern to make multiple copies of the finished mosaic. The mosaic can be sanded and varnished to provide a protective layer.

Experience using the technique described above suggests the best results are achieved when the number of discrete colors of wood used is as few as two, but less than thirteen. More than a dozen colors can make the assembly process too detailed, complex or time-consuming for an amateur artist. Also, amateur artists will find a pattern that has cells which are three sticks by three pixels and a frame that has slots three pixels wide, easy to use. Assembly is also assisted by placing graduated markings on the frame and corresponding graduated markings on the pattern. A transparent ruler can also be provided to periodically check to ensure the sticks inserted into the frame have been inserted squarely and are packed tightly along the length of the slots. This is desirable to ensure the length of the columns or rows created using the sticks are substantially equal to the number of sticks along the length times the dimension of an individual stick along that length.

The invention is illustrated and described in relation to specific embodiments to meet the disclosure requirements of the patent laws. The invention, however, is not limited to the embodiments illustrated and described or to the details of those embodiments. From the disclosure provided, those skilled in the art will appreciate various modifications to the frame, pattern, and assembly methods can be made without departing from the spirit of the invention. All such modifications are intended to also be covered so long as they fall within the scope and range of equivalents of the claims.

BRIEF DESCRIPTION OF THE DRAWINGS

The apparatus and method for making multiple copies of mosaics will best be understood from the following description when read in connection with the accompanying drawings in which.

DETAILED DESCRIPTION OF EXEMPLARY EMBODIMENTS

A starting point for an artist creating a mosaic is to develop a pallet of colors from the materials available to the artist. As set forth in FIG. 8A, when the present invention is employed. The process begins at step 70 by obtaining wood of differing species having differing color tones. Alternatively, wood can be stained with a penetrating stain to provide the different colors desired. In either case, the wood is cut into elongated sticks at step 72. Each stick should have a square cross-section of the same dimension. The sticks are then arranged into groups by color at step 74.

Figure 1:
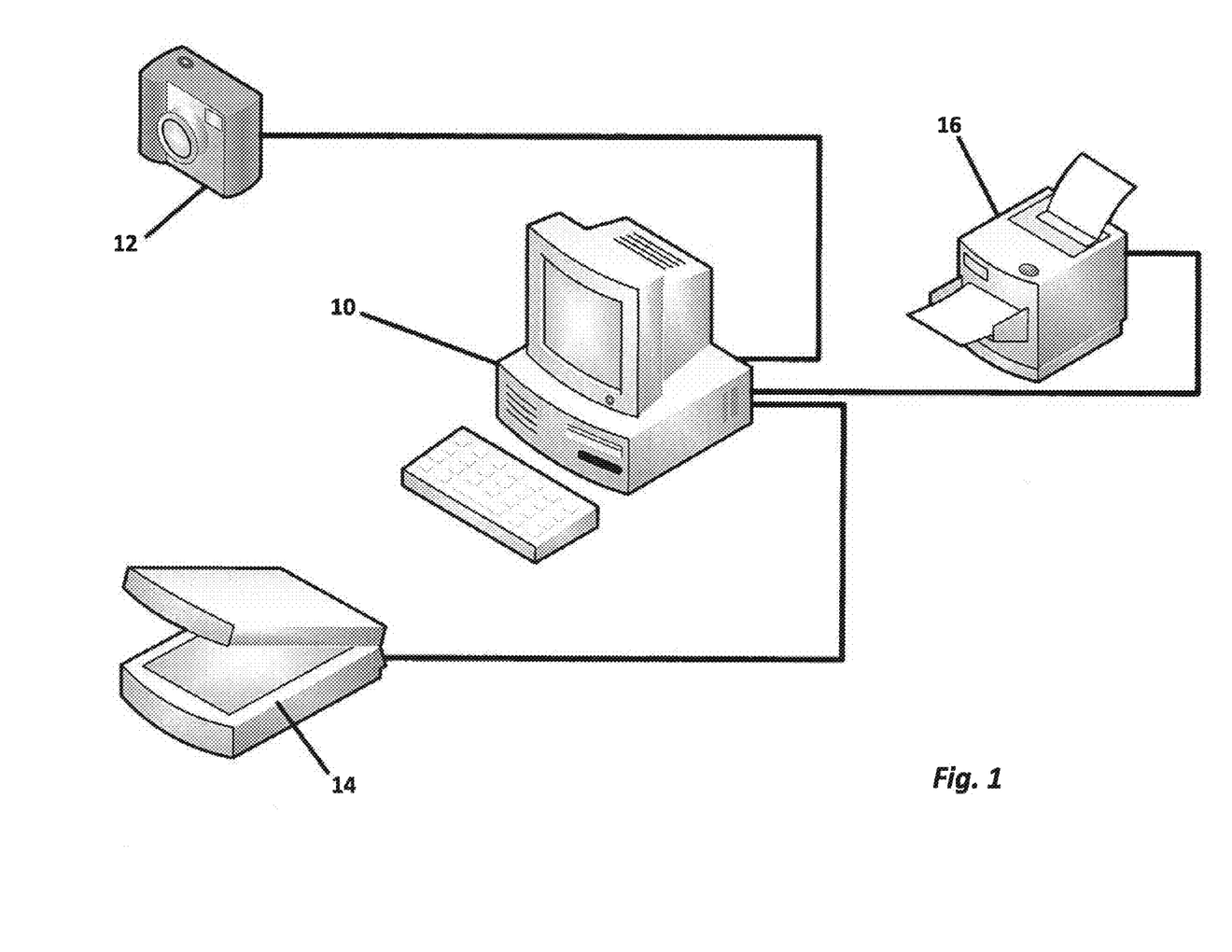
FIG. 1 is a schematic diagram of an apparatus which may be employed to create a pattern for producing mosaics.

Any artist creating a mosaic must also have a pattern or template in mind for the mosaic. FIG. 1 represents equipment readily available today which allows a pattern or template to be created. Such equipment may include a computer 10, a digital camera 12 or a scanner 14. A color printer 16 is also shown attached to the computer 10. The computer 10 can be used by the artist to develop a design from scratch. Alternatively, the source of the design may be any photograph captured using the digital camera 12. The source may also be any two-dimensional image, such as a drawing, painting, or photographic print, captured as a digital image using the scanner 14. While a camera 12 and scanner 14 are specifically shown, digital images may also be transferred to the computer from virtually any known source using the various ports and drives typically found on a computer 10. Digital images may even be transferred to the computer 10 via the Internet.

Figure 2:
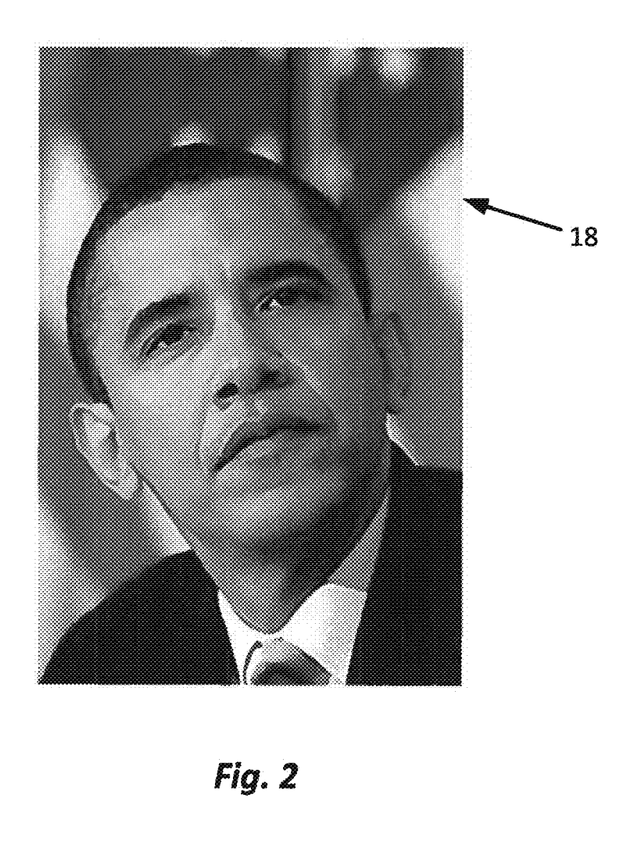
FIG. 2 is an example of an initial image which may be digitized.
Figure 3:
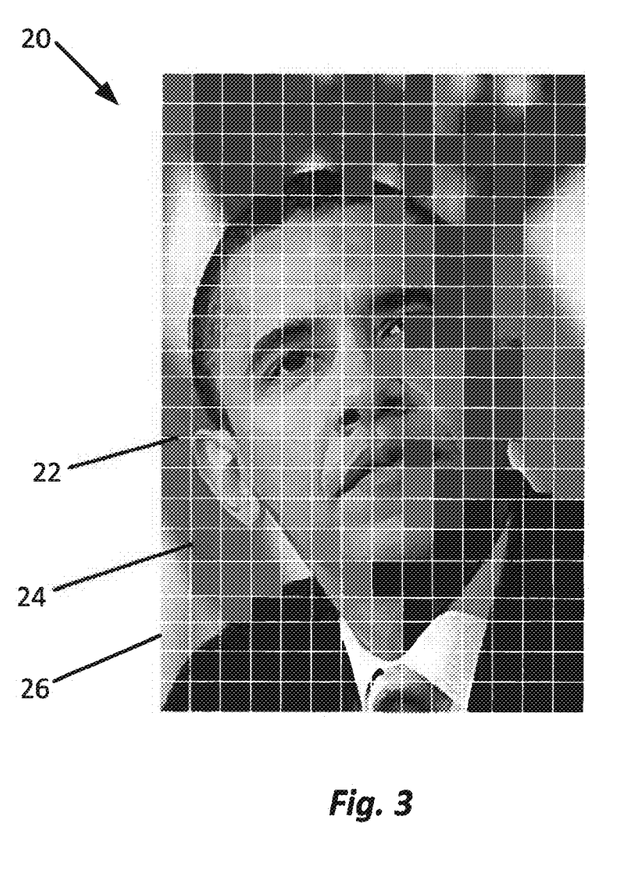
FIG. 3 is an example of an initial image which has been pixilated.
Figure 4:
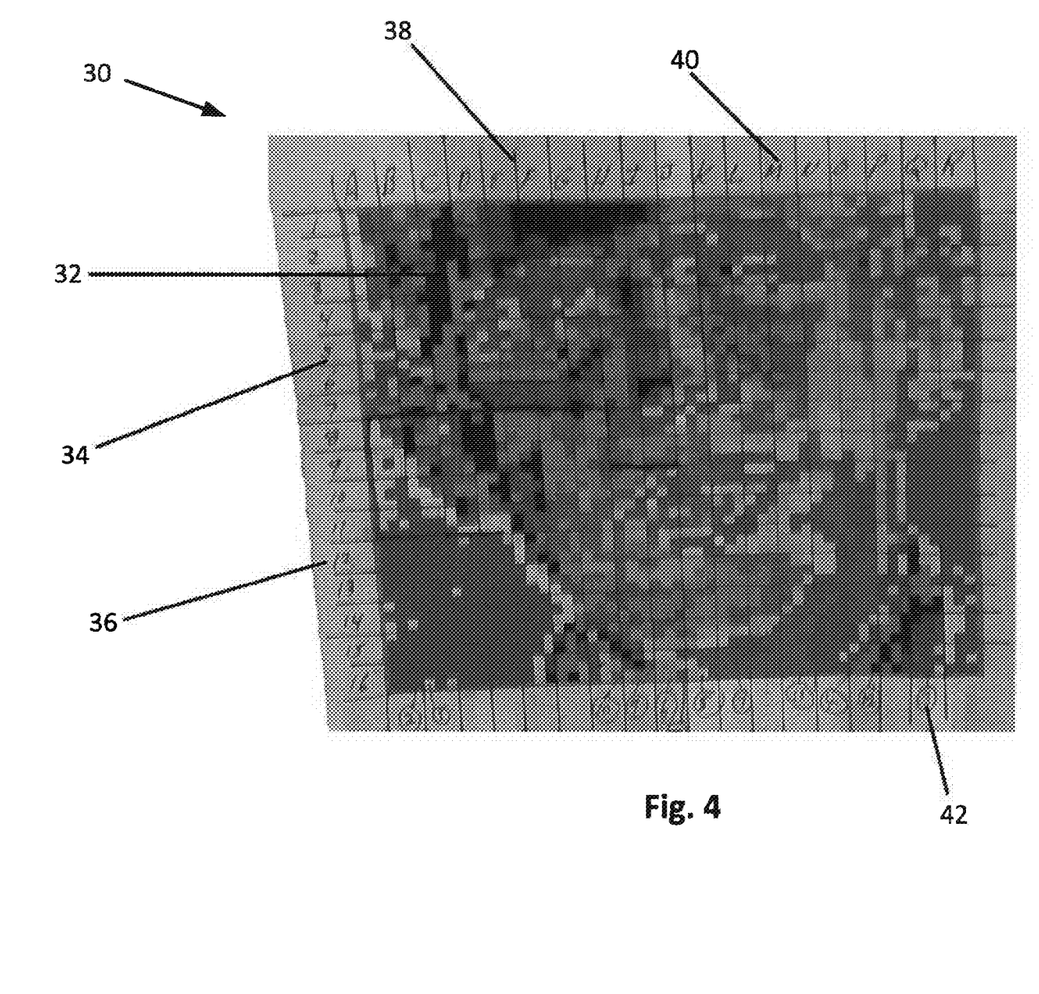
FIG. 4 is an example of a pattern made from the initial image printed using exaggerated colors, divided into columns and rows each three pixels wide with each column and row labeled in a graduated fashion.
Figure 8A:
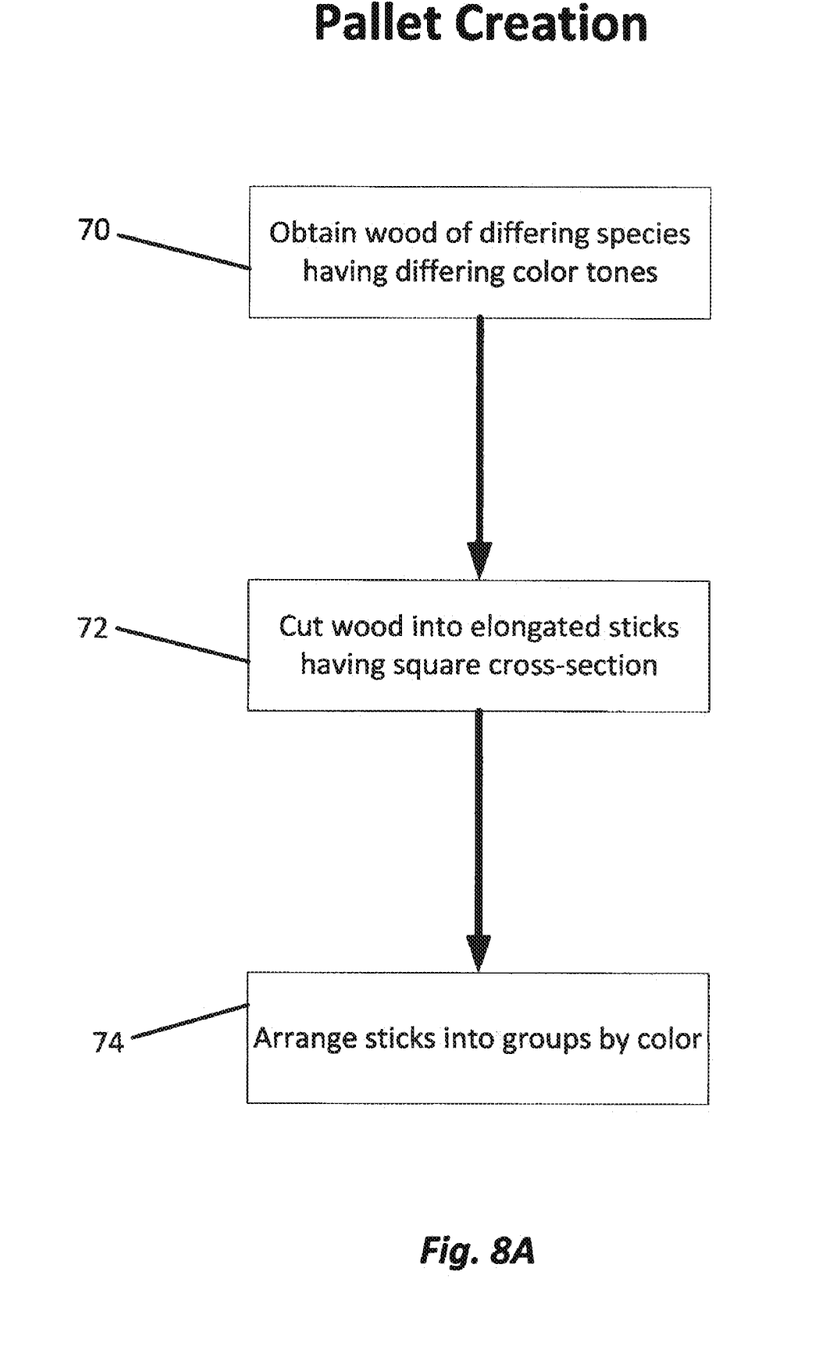
FIGS. 8A-8C are a flow diagram of the method used to create the mosaic of FIGS. 7A and 7B.
Figure 8B:
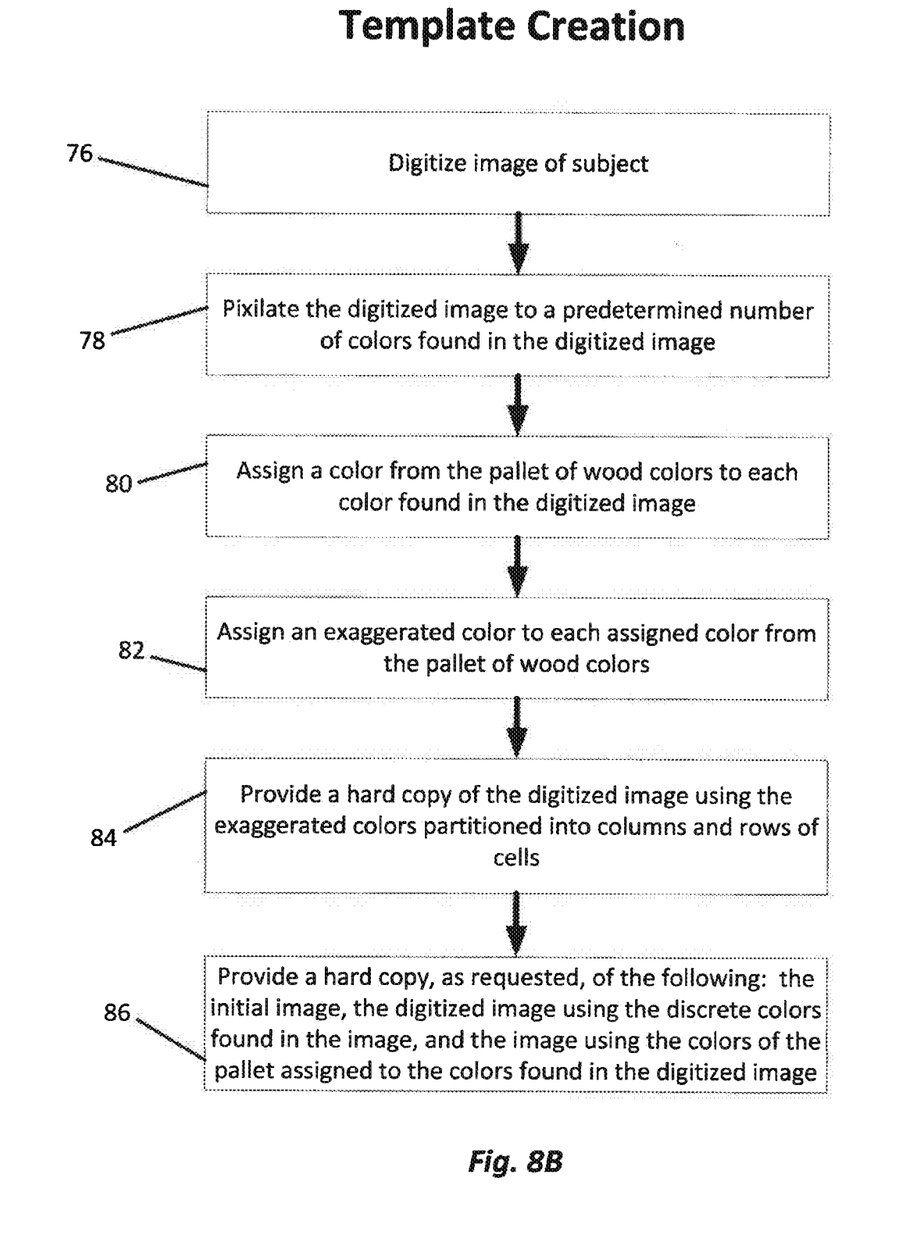

With reference to FIG. 8B, the steps for converting an image such as that shown in FIG. 2 into a template or pattern such as that shown in FIG. 4 will now be described. At step 76, the image 18 of FIG. 2 is digitized using the scanner 14 of FIG. 1 and transferred to the computer 10. The computer 10 is then used to pixilate the digitized image 20 at step 78 as represented by FIG. 3. Adobe Photoshop® is commercially available software that can be used to provide a pixilated image where the cell size is selectable. When the digital image 20 is pixilated, it is divided into cells 26 using horizontal lines 22 and vertical lines 24. Still at step 78, each cell is then assigned one of a predetermined number of colors based on the colors found in the corresponding cell of the image 18.

At step 80, the computer 10 is used to assign to each color found in the digitized image 20 a color from the pallet of wood colors developed using the steps previously described with reference to FIG. 8A. Subtle differences will exist between the colors of the pallet of wood colors so it is advantageous to also assign an exaggerated color to each assigned color from the pallet of wood colors. This occurs at step 82. With the assignment of pallet and exaggerated colors complete, various copies of the digitized photo may now be printed. As set forth at steps 84 and 86, such copies may include a copy of the digitized image using the discrete colors found in the image when it is scanned, a copy of the digitized image using the colors of the pallet assigned to the image, and a copy of the digitized image using the exaggerated colors assigned. A pattern or template made using the exaggerated colors is shown at 30 in FIG. 4. As indicated at step 84, the copy provided using the exaggerated colors is partitioned into columns 40 and rows 36 of cells 32. This may be done using the computer or after the copy is printed using a marker and a straight edge by drawing horizontal lines 34 and vertical lines 38. Each cell 32 is multiple pixels wide and long. As shown, the cells 32 contain nine pixels arranged in a three-by-three array. The columns and rows may also be labeled in a graduated fashion as shown in FIG. 4. Also, a key 42 can be assigned to each of the colors. As suggested at step 86, the original image is also available, particularly if the scanner 14 was used to digitize the image.

Figure 8C:
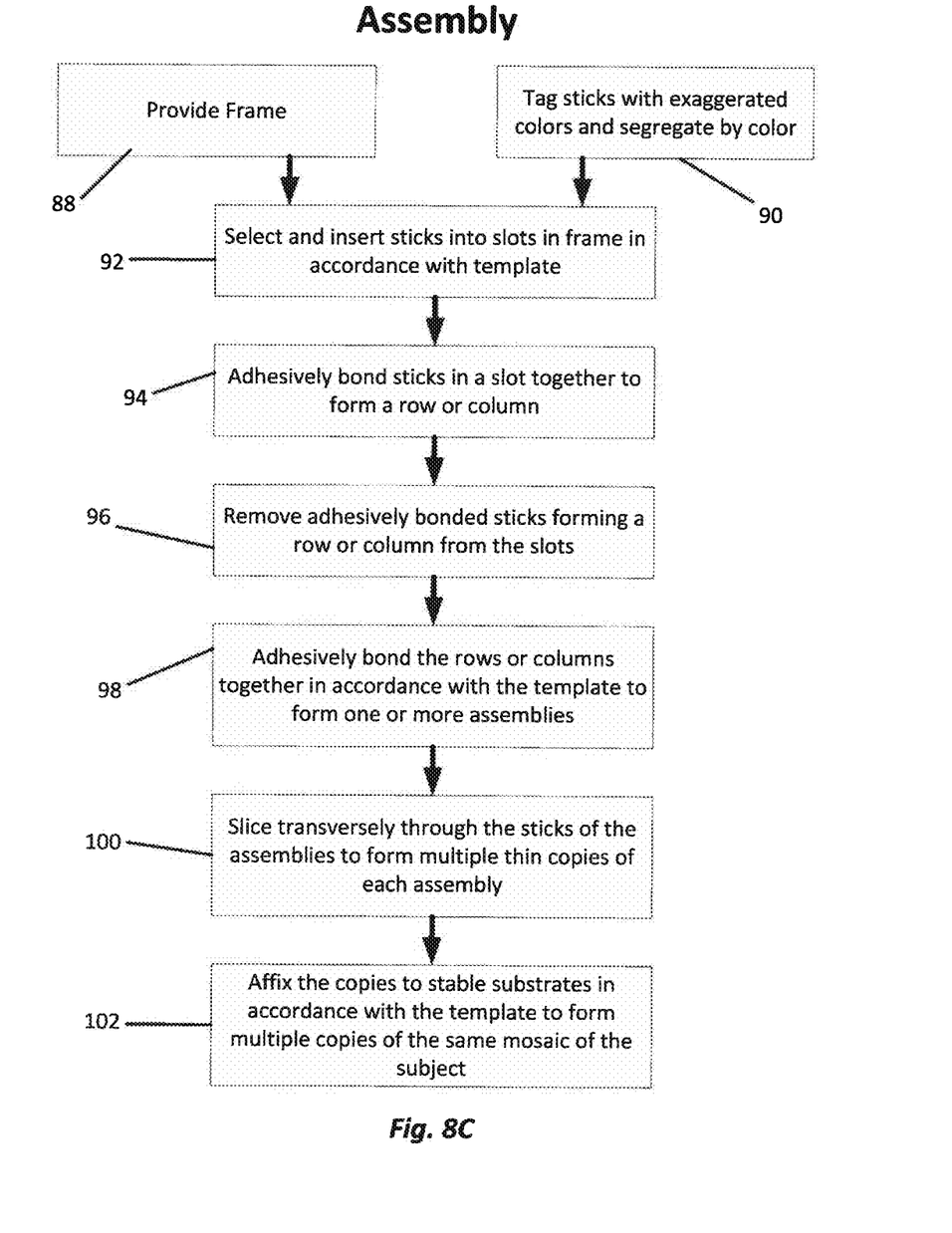

Actual assembly of the mosaic using the pallet created using the step identified in FIG. 8A and the template created using the steps identified in FIG. 83 will now be described with reference to FIG. 8C.

Figure 5:
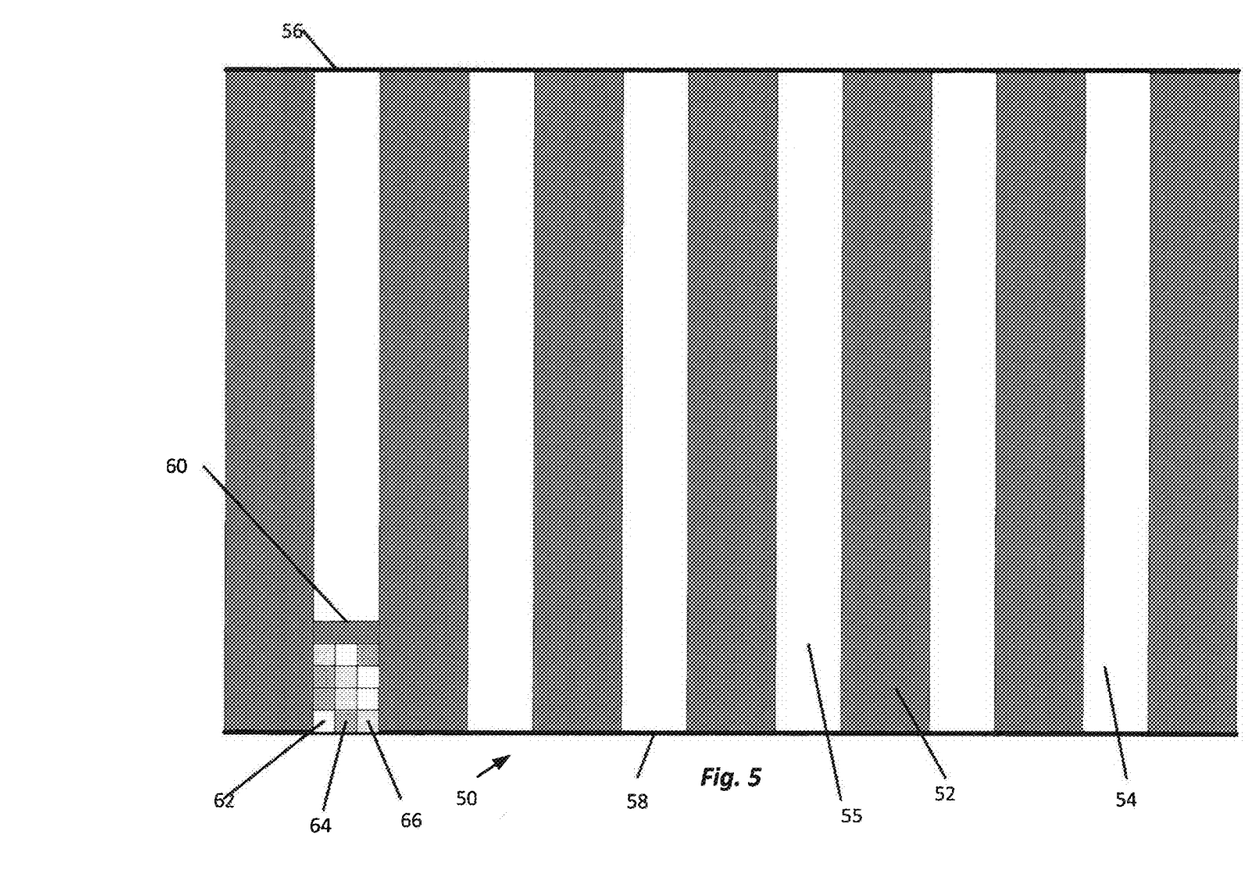
FIG. 5 is a top view of a frame used to assemble the mosaic based on the pattern.
Figure 6:
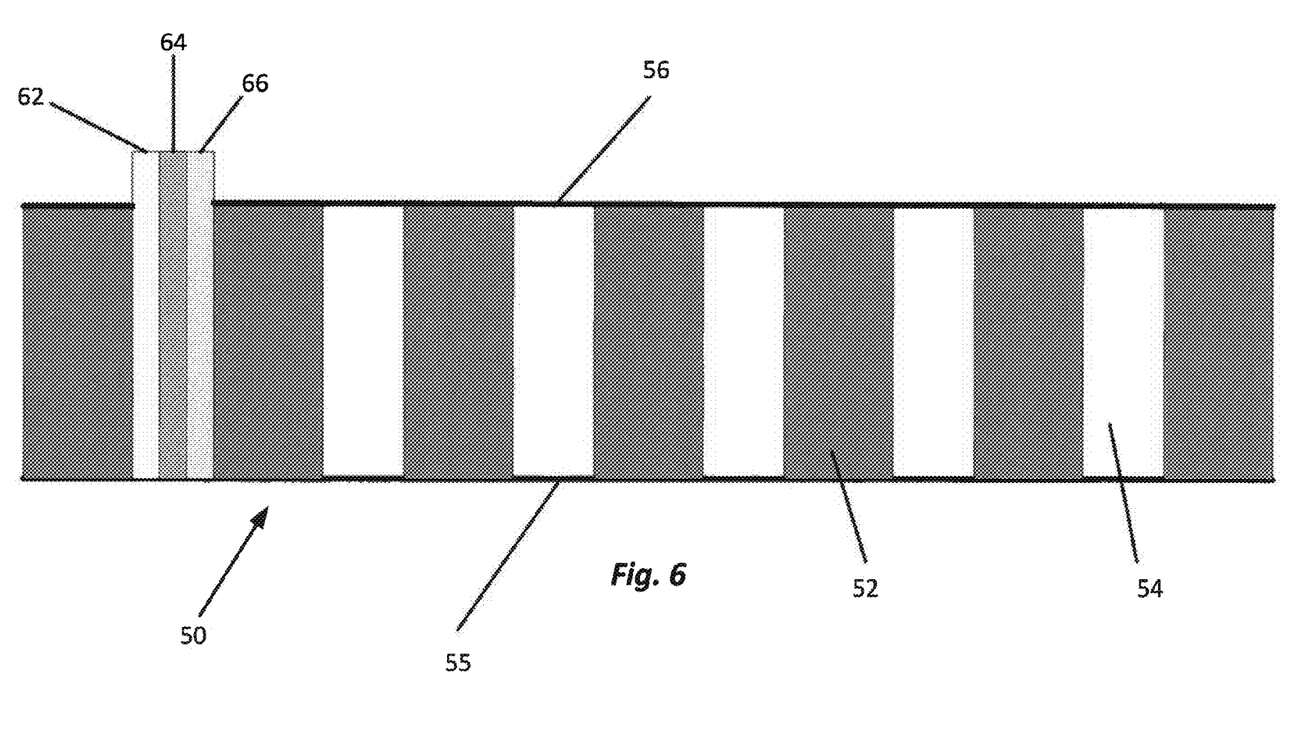
FIG. 6 is a cross-sectional view of the frame of FIG. 5.

Step 88 requires that a frame be provided. An example of such a frame 50 is illustrated in FIGS. 5 and 6. Frame 50 has a plurality of partitions 52. Slots 54 separate adjacent partitions 52. Each slot 54 preferably has a width substantially equal to the number of pixels along the length or width of a cell 32 of the pattern 30 times the width or length of the cross-section of the sticks. Thus, the slots 54 correspond to either the rows 36 or columns 34 of the pattern depending on the preference of the artist. The frame also includes a bottom wall 55 and end walls 56 and 58. These walls 55, 56 and 58 may be made of a material which can be flexed.

FIGS. 5 and 6 also show four rows of different colored sticks 62, 64 and 66 inserted into the frame 50. To hold the sticks square and true, a holder 60 is also provided. The holder 60 is dimensioned to fit snuggly in the slots 54 between adjacent partitions 52.

Returning to FIG. 8C, to speed assembly and placement of the sticks 62, 64 and 66 in the slots in conformance with the pattern 30, the sticks may be tagged with the exaggerated colors at step 90. This can be done by tagging the sticks themselves or by tagging the bins in which the sticks are placed. In any event, at step 90 the sticks are segregated by color.

At step 92, the sticks are selected by picking them from the bins and inserting into slots 54 in the frame according to color to match the pattern or template 30. Each slot 54 in the frame corresponds to one of the rows 36 or columns 40 of the pattern 30. Before inserting the sticks, it may be advantageous to line the frame 50 with a release material, such as wax paper, because, at step 94, the sticks are glued while still in the slots 54 to bind the sticks together into a row or column corresponding to a row 36 or column 40 of the pattern 30. The release material will keep the glue from also bonding the sticks to the various parts of the frame 50 and thereby simplifying later removal.

Once the glue is set, the adhesively bonded sticks forming a row or column are removed from the slots at step 96. Removal is made easier if at least the bottom wall 55 is made of a flexible material because this allows the bottom wall 55 to be flexed to separate the partitions 52 of the frame 50 from the columns or rows of sticks formed in the slots 54 of the frame 50.

With a plurality of rows or columns of sticks having been formed in and then removed from the frame 50, it is possible at step 98 to adhesively bond adjacent rows or columns of sticks together in accordance with template 30 to form one or more assemblies. Since the assemblies will be sliced into multiple thin copies of uniform thickness at step 100, the number of columns or rows of sticks glued together to form each assembly will depend on the cross-section through the assembly able to be cut using the saw or cutting tool used to form the slices. The slices formed at step 100 should have a uniform thickness. If the same saw is used to form the slices at step 100 as was used to form the sticks at step 72 of FIG. 8a, no adjustment of the saw should be required to provide assemblies with a thickness matching the length and width dimension of the cross-section of the individual sticks.

Figures 7A, 7B:
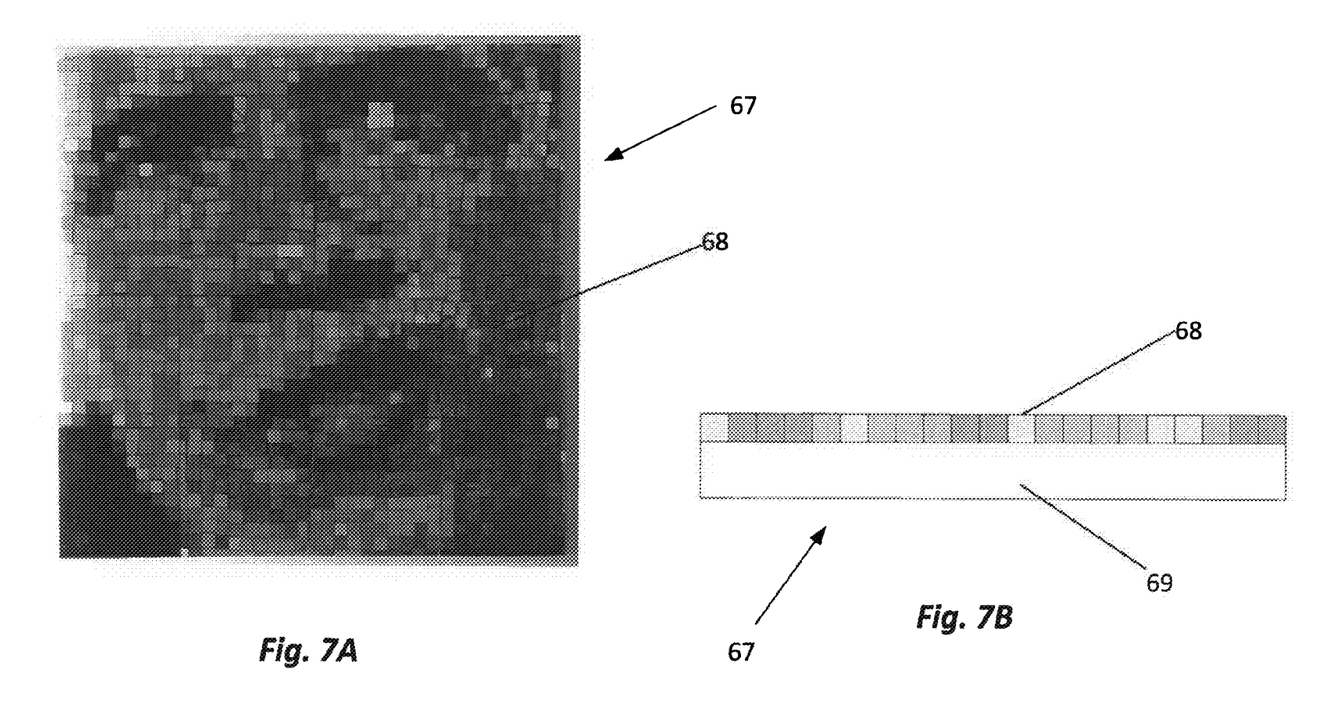
FIG. 7A is a top plan view of a mosaic made in accordance with the present invention.
FIG. 7B is a side view of the mosaic of FIG. 7A.

At step 102, the slices formed at step 100 are affixed, again in conformance with the pattern 30, to stable substrates to form multiple copies of the same mosaic of the subject. FIGS. 7A and 7B show such a mosaic 67 comprising a veneer 68 made up of the slices of the assembly which have been bonded to a substrate 69.

Once the mosaic 67 is complete, the veneer may be lightly sanded so the top surface of the mosaic is smooth. A varnish or other sealer may be applied to provide a desired sheen and protect the veneer. The number of copies of the mosaic 67 created using this process is strictly a function of the length of the sticks used and the thickness of each slice made at step 100.

Those skilled in the art will recognize the method described above can be employed to create a template from any image which can be digitized and that template and the frame can be used to create a mosaic of any image. Further the same frame can be used to make a mosaic of virtually any size since the frame is used to form columns or rows, or portions thereof, which are joined together to form assemblies. The assemblies do not necessarily represent an entire mosaic, but may only represent a small portion of a much larger mosaic.

The present invention is ideally suited for creating a limited number of copies (e.g., 10) at one time. It is envisioned that an artist may use the present invention to create mosaics having limited rather than broad demand. For example, an artist might obtain an original image from a customer, such as a recently deceased loved one, and use that image to create a template and a limited number of copies of the mosaic which would be cherished by the family members of the deceased, but may not have broader public appeal.

Figure 9:
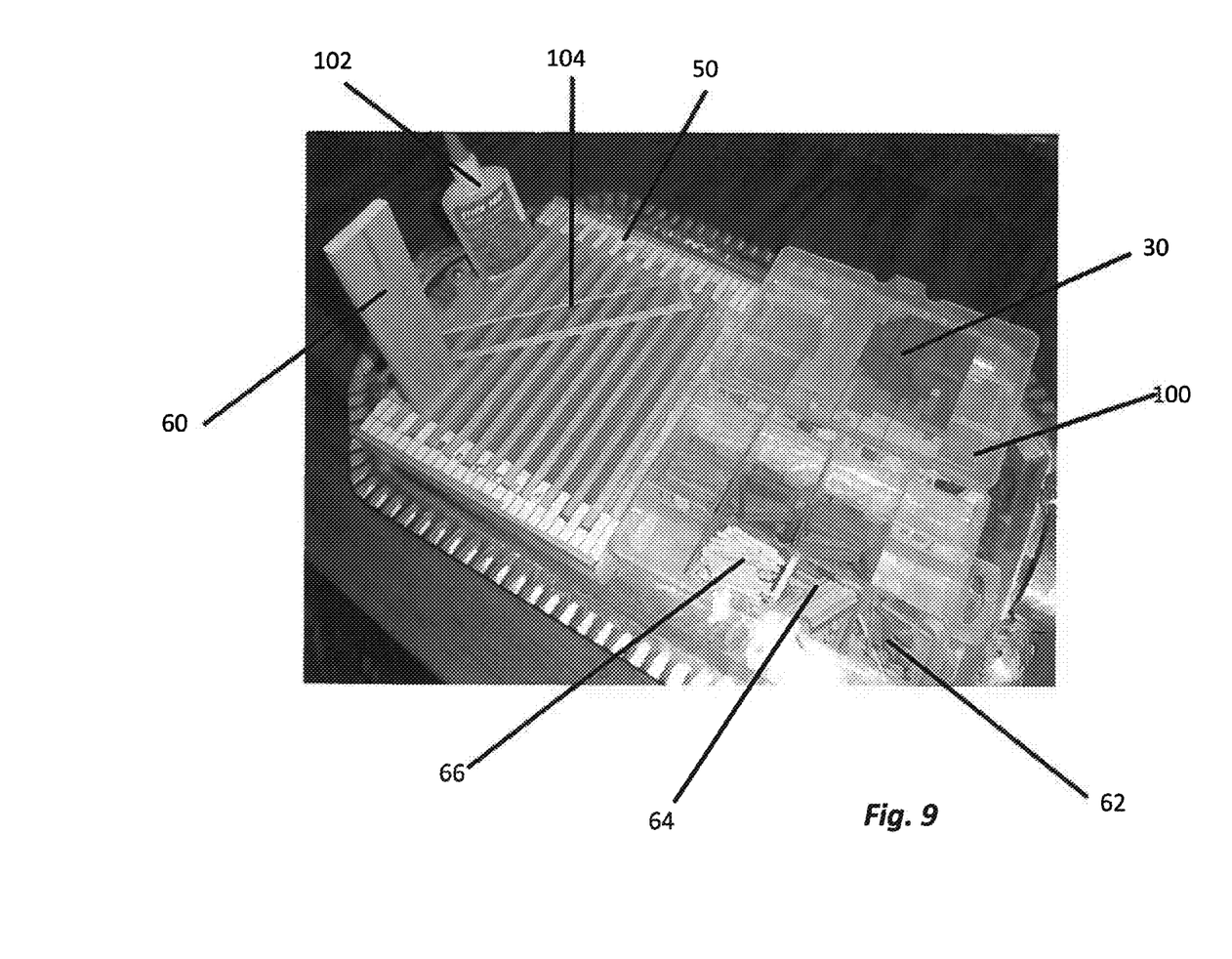
FIG. 9 shows a kit providing the material needed to assemble multiple copies of a mosaic.

Further, kits could be created on a special order basis for a customer who wishes to create a limited number of copies of a mosaic. Using an original image provided by a customer, the kit maker could create a kit such as that shown in FIG. 9. The kit would typically contain a template 30 of the original image, a case 100 having bins which are color coded with tags corresponding to the exaggerated colors of the template. The kit also contains the sticks (e.g., 62, 64, 66) separated by the colors of the pallet and placed in the bins by color. Other components of the kit may include a frame 50, a holder 60, a bottle of glue 102, and a clear plastic ruler 104. The clear plastic ruler 104 will allow the kit's user to easily measure the columns or rows of sticks formed in the slots of the frame to ensure the sticks are properly aligned and tightly packed in the slots so the columns or rows of sticks will be uniform when they are removed from the frame. Even waxed paper for lining the frame and the substrate (not shown in FIG. 1) to which the mosaic is attached may be provided as part of the kit. Using the kit shown in FIG. 9, multiple copies of a unique and individualized mosaic can be easily and quickly created.

Again, it should be apparent to the reader, and particularly those skilled in the art, that the present invention is not limited to what has been particularly shown or described herein. The scope of the invention is defined only by the claims which follow and equivalents thereto.

What is claimed is:

1. A method for producing multiple mosaics of an image, comprising the steps of:
   (a) providing elongated wooden sticks of square cross-section and of differing color characteristics;
   (b) arranging the sticks into groups according to color characteristics to thereby create a pallet of available wood colors;
   (c) digitizing an initial image of a subject and pixilating the image on a computer to a predetermined number of discrete colors actually found in the image;
   (d) creating a pre-pattern for the mosaic on the computer by assigning a color from the pallet of available wood colors to the discrete colors found in the initial image;
   (e) creating a final pattern by (i) assigning an exaggerated color to each of the colors assigned when creating the pre-pattern, and (ii) by providing a hard copy of the digitized image using the exaggerated colors, the hard copy of the digitized image being partitioned into columns and rows of cells, each cell being a predetermined number of pixels long and a predetermined number of pixels wide;
   (f) organizing the sticks by tagging the sticks of a particular group with the exaggerated color corresponding to the color of the group and placing each group in a separate bin;
   (g) providing a frame having a plurality of elongated slots, each of a transverse dimension substantially equal to the number of pixels long or wide of a cell of the pattern times the cross-sectional dimension of the individual sticks;

(h) selecting sticks from the bins and inserting them into slots of the frame in accordance with the pattern and adhesively bonding the sticks in a given slot to one another to form a row or a column;

(i) removing the adhesively bonded row or columns of step (h) from the frame and adhesively bonding the rows or columns together following the pattern;

(j) slicing the assembly of step (i) transversely through the sticks into multiple layers; and (k) affixing the multiple layers of step (j) individually to stable substrates.

2. The method of claim 1 and further including the steps of sanding and varnishing the assemblies of step (k).

3. The method of claim 1 and further including a step of lining the frame of step (g) with a release paper prior to step (h).

4. The method of claim 1 wherein the predetermined number of discrete colors is as few as two.

5. The method of claim 4 wherein the predetermined number of discrete colors is less than thirteen.

6. The method of claim 1 wherein each cell comprises nine pixels arranged in a 3×3 array.

7. The method of claim 1 wherein the step of creating the final pattern also includes providing the initial image.

8. The method of claim 1 wherein the step of creating the final pattern further includes providing a hard copy of the digitized initial image using the discrete colors found when digitizing the initial image.

9. The method of claim 1 wherein the step of creating the final pattern further includes providing a hard copy of the image using the colors from the pallet of available wood colors assigned during the step of creating a pre-pattern.

10. The method of claim 1 wherein the step of creating the final pattern further includes (i) providing the initial image; (ii) providing a hard copy of the digitized initial image using the discrete colors found when digitizing the initial image; and (iii) providing a hard copy of the image using the colors from the pallet of available wood colors assigned during the step of creating a pre-pattern.

11. The method of claim 1 further including the step of providing graduated markings on the frame.

12. The method of claim 1 wherein the frame has a flexible bottom which is flexed to assist in removing the adhesively bonded columns from the frame.

13. The method of claim 1 further including the step of using a transparent ruler to periodically check to ensure the sticks inserted into the frame have been inserted squarely and are packed tightly.

14. The method of claim 13 wherein the step of using the transparent ruler to periodically check to ensure the sticks inserted into the frame have been inserted squarely and are packed tightly includes measuring the length of a column created using the sticks to ensure its length is substantially equal to the number of sticks along that length times the dimension of an individual stick along that length.

* * * * *